No. 621,608. Patented Mar. 21, 1899.
A. C. JOHNSON.
APPARATUS FOR MAKING SULFURIC ACID.
(Application filed Oct. 24, 1898.)
(No Model.)
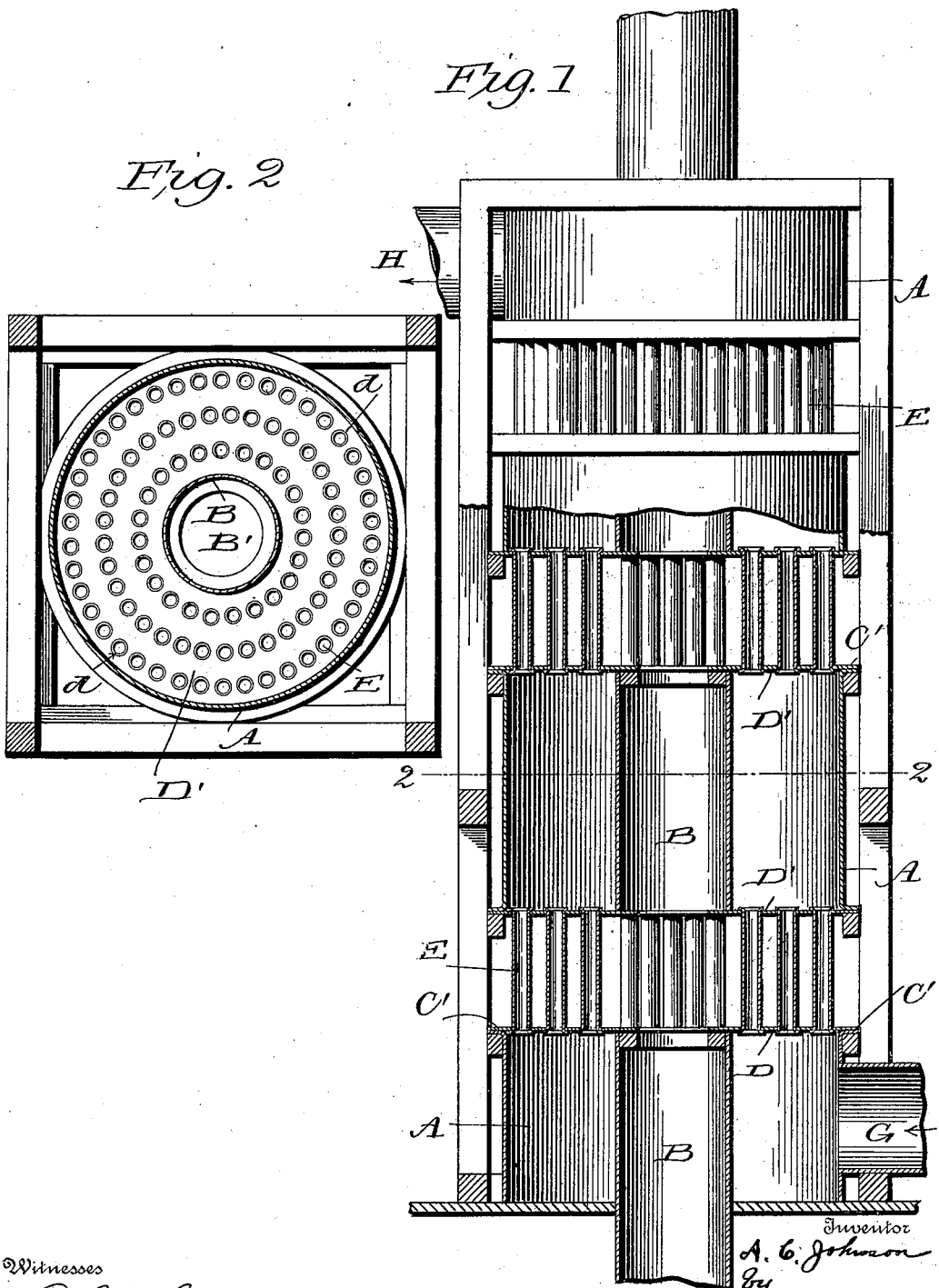

UNITED STATES PATENT OFFICE.

ALBERT COLLOM JOHNSON, OF BALTIMORE, MARYLAND.

APPARATUS FOR MAKING SULFURIC ACID.

SPECIFICATION forming part of Letters Patent No. 621,608, dated March 21, 1899.

Application filed October 24, 1898. Serial No. 694,400. (No model.)

*To all whom it may concern:*

Be it known that I, ALBERT COLLOM JOHNSON, a citizen of the United States, residing at Baltimore, in the State of Maryland, have invented certain new and useful Improvements in Apparatus for the Manufacture of Sulphuric Acid; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus utilized in the manufacture of sulphuric acid, and especially to the provision of means whereby the formation into acid of the gas coming from the Glover tower or from any one of the large acid-chambers now in ordinary use may be expedited by its passage through a series of little cooling-chambers having a peculiar arrangement of flues through which the gas passes, coming into contact with the cooling liquid, which trickles down through the flues, which are surrounded by air-spaces, through which a current of air circulates.

More specifically the present invention resides in the provision of a series of little cooling-chambers superimposed on one another, having communicating flues through which the gas passes from one little chamber to another, and the provision of a central air-shaft through the tower extending above sufficiently to insure good draft, into which shaft air is drawn through the bottom and also through apertures in the circumference thereof from the flue-sections.

My invention is clearly illustrated in the accompanying drawings, which, with the letters of reference marked thereon, form a part of this application, and in which—

Figure 1 is a central vertical longitudinal section of a series of compartments in one of my towers, and Fig. 2 is a cross-sectional view on line 2 2 of Fig. 1.

Reference now being had to the details of the drawings by letter, A designates the outer shell of the tower, which is made, preferably, of lead, and centrally and longitudinally disposed in said tower is an air-shaft B, through which cool air circulates and against the outer wall of which the gas comes in contact, causing a rapid formation of acid from the vapors contained therein. It is my purpose to provide a series of little chambers or compartments C, which may be of any desired shape. These chambers are made, preferably, of lead, and each has an outwardly-turned flange C', which rests upon and is secured by any suitable means to the wood or iron framework of the tower. Each compartment C has a central aperture, through which the central air-shaft passes, as shown, and the compartment may be secured to the shaft in any suitable manner, as by lead-burning. Resting on the flanged edges at the upper end of the lower compartment-shell is a disk D, which contains a series of perforations $d$, (illustrated clearly in the cross-sectional view,) in each of which perforations is passed a tube E, also of lead, and has its lower end flanged and burned by the process known as "lead-burning" over the margin of the aperture containing same. These tubes may be of any desired length which may be found to be best adapted for the purpose for which they are intended, and the upper end of each flue or tube E is also flanged and similarly secured to a perforated plate or disk D'. When all of the perforations of the disks are filled, with the tubes or flues they make up a compartment which affords a means of communication from the chamber C beneath to a similar chamber C resting on the disk D', forming the upper end of the tubular compartment. It will be observed that each disk D and D' has a large central perforation, through which the central air-shaft passes, and about the circumference of said shaft, where it passes through the tubular compartment, are perforations B', through which air entering from the circumference of the tower between the tubes is allowed to pass into the central air-shaft and out at the top thereof. The disks D and D' may be secured to the shaft by any suitable means, preferably by lead-burning.

Leading into the tower near its lower end is an inlet-tube G, which conveys the gas from the Glover or other tower or chamber to the lower compartment of my tower, and at the upper end of the tower A an exit-pipe H leads away, through which the excess of gas is allowed to pass to one of the leaden chambers now in common use or to another similarly-arranged tower.

In the drawings I have shown four compartments, between each of which is disposed a tubular compartment, whereby the gas entering at the bottom is allowed to rise up through the tubes E from one compartment to another until it has passed through all of the compartments of the tower, whence it passes to the said chambers or to the next tower. As the gas rises and coming into contact with the cool walls of the compartments and tubes connecting same and about which tubes cool air is circulating a portion of the gas will form into acid and will trickle down through the tubes, and this liquid which runs down through the various tubes or flues will offer an extensive cooling-surface to the gas, which necessarily must come in close contact with the liquid-covered walls, thus further expediting the process.

While I have described in detail a construction for a tower for the manufacture of sulphuric acid, as illustrated in the drawings, still the mechanical arrangement of the apparatus may be changed as to details without departing from the spirit of my invention.

Having thus described my invention, what I claim to be new, and desire to secure by Letters Patent, is—

1. An apparatus for condensing gas, comprising the cooling-tower made up of a series of cylindrical receptacles, superimposed on one another, with intervening spaces, a series of open-ended tubes communicating between said receptacles and located in said spaces, central walled passage-ways through said receptacles as set forth.

2. An apparatus for condensing gas, comprising a cooling-tower made up of a series of receptacles with spaces intervening between the same, framework having cleats on which said receptacles are supported, each receptacle having a central and vertical walled passage-way, perforated disks with enlarged central apertures, said disks forming the ends of the receptacles, tubes mounted in said perforations, and communicating between the receptacles, as set forth.

In testimony whereof I affix my signature in presence of two witnesses.

ALBERT COLLOM JOHNSON.

Witnesses:
ENOCH HARLAN,
CHARLES H. MILLIKIN.